United States Patent [19]

Schmale et al.

[11] Patent Number: 5,531,504
[45] Date of Patent: Jul. 2, 1996

[54] ARTICULATED ARMATURE FOR SEATS WITH ADJUSTABLE BACKS, IN PARTICULAR FOR MOTOR VEHICLES

[76] Inventors: Gerhard Schmale, Jung-Stilling-Str. 68, Huckeswagen, Germany, (42499); Ralf Hoge, Espertstrasse 18, Radevormwald, Germany, (42477); Martin Zynch, Reinwardstrasse 26, Remscheid, Germany, (42899)

[21] Appl. No.: 142,406

[22] PCT Filed: May 22, 1992

[86] PCT No.: PCT/EP92/01145

§ 371 Date: Nov. 24, 1993

§ 102(e) Date: Nov. 24, 1993

[87] PCT Pub. No.: WO92/21531

PCT Pub. Date: Dec. 10, 1992

[30] Foreign Application Priority Data

May 28, 1991 [DE] Germany ............... 41 17 497.6

[51] Int. Cl.[6] ........................................... B60N 2/02
[52] U.S. Cl. ........................... 297/362; 297/354.12
[58] Field of Search ............... 297/362, 361.1, 297/362.12, 362.14, 354.12; 74/462, 424.8 C

[56] References Cited

U.S. PATENT DOCUMENTS

| | | |
|---|---|---|
| 4,573,739 | 3/1986 | Schotter ............... 297/362 |
| 4,668,013 | 5/1987 | Wahlmann ............... 297/562 |
| 4,717,204 | 1/1988 | Tezuka ............... 297/362 |
| 4,786,110 | 11/1988 | Mahling et al. ............... 297/362 |
| 4,874,204 | 10/1989 | Walk ............... 297/362 |
| 4,895,038 | 1/1990 | Pipon et al. ............... 297/362 X |
| 4,986,602 | 1/1991 | Blanchard ............... 297/362 |

*Primary Examiner*—Laurie K. Cranmer
*Attorney, Agent, or Firm*—Harness, Dickey, & Pierce

[57] ABSTRACT

Backrests of motor vehicle seats are attached so that their inclination can be adjusted and fixed by way of hinge mountings 1 with eccentric planetary gears 2, the rolling bodies of which are made by extrusion moulding.

To increase the fracture resistance of the tooth systems, the teeth of the outer and inner tooth systems 5 and 6 are both attached laterally through strong annular material regions 7 and 8 respectively which avoid stress concentrations, and also, to produce a good lateral engagement relationship of the tooth systems, the rolling bodies 3 and 4 are mounted on the axis 9 in a manner effective to prevent tilting, namely by extending the bearing surfaces through hubs 10 and 11 and spacing the bearing faces of the two rolling bodies equidistant from the centre 12 of the external and internal tooth systems 5 and 6 respectively.

13 Claims, 6 Drawing Sheets

ARTICULATED ARMATURE FOR SEATS WITH ADJUSTABLE BACKS, IN PARTICULAR FOR MOTOR VEHICLES

For seats, particularly for motor vehicles, that have adjustably reclining backrests, hinge mountings are known that comprise an external mounting, fitted externally on the seat, that can be pivoted, adjusted and secured by self-locking by means of an eccentric planetary gear.

In a hinge mounting of this kind according to German patent 1 680 128 it has been proposed to use a combined finishing stamping and extrusion moulding process to make the bridge part of the mounting integrally with the internal gear of the hinge member, and also the spur gear integrally with its associated hinge member, in each case with the width of the teeth being less than the thickness of the material of the hinge member by an amount corresponding to the extent of the pressing out. As shown by the mechanisms supplied according to this invention, and also as illustrated in the drawings, this difference amounts to about 30%. This reduction of the width of the teeth by about 30% of the thickness of the starting material is disadvantageous, as are the abrupt contours that are formed on the opposite side of the tooth systems that are used by the correspondingly offset protruding tooth system, which exhibit very large variations in cross-section and thereby lead to harmful stress concentrations in their connection regions. For this reason, to obtain adequate stability in such hinge mountings the starting material used has to be thicker than is required by the stresses to which these hinge members would be subjected if they had a more suitable form. This is undesirable on grounds of both weight and cost, particularly in motor vehicles.

To obviate these difficulties, the known German patent 28 34 492 proposes, in the case of the hinge members—likewise made by extrusion moulding—to line up the inner sides of the pressed-out areas with the outer sides of the hinge member in one plane, i.e. to make the width of the teeth the same as the thickness of the starting material and to make the connection between the two parts only through thin wall bridges that run round the fully pressed-out high tooth profile present on the sides of the mountings that are not used as rolling bodies. Because of the form of these tooth profiles extremely high additional bending stresses are introduced. This has the disadvantage that these relatively small wall bridges, which lie predominantly at right angles to the axis and carry bending and compressive loads, are highly stressed because of their small section. The unfavourable orientation of these stresses to the direction of loading also leads to high stress concentrations when they follow very different paths. This, combined with the high bending stresses and the notch effects introduced by the abrupt changes in section, further detracts from the load-bearing capacity, since cracks can also form and tearing can often occur, so that the high security against fracture that is required cannot be guaranteed under high loads. These unfavourable effects of the wall bridges, which are both thin and relatively long on the outside, substantially reduce the durability of the hinge mountings proposed in this patent in case of overloading in the so-called crash situation.

In addition, problems arise related to manufacturing technique owing to influences such as variations in the thickness and differences in the hardness of the starting material, machine settings, tool tolerances and tool wear in maintaining very high accuracy in the load-bearing small sections required by this proposal. For example, with an indentation that is only a few tenths of a millimeter too deep the wall bridges are too thin or are even locally broken through, since these thin places tear prematurely.

In the case of the known proposal in German patent 32 44 399 the unfavourable stress conditions for the tooth bodies again occur. The object here is to increase the width of the teeth of the load-bearing elements—again produced by extrusion moulding—relative to the thickness of the starting material, with the material required for this being made available by increasing the area of the indented tooth region opposite. This however increases the bending moment on the teeth under load, and since the connection of the root of the tooth is not widened to the same extent the stresses occurring under load are increased. Together with the high bending stresses that again occur here owing to the alternating abrupt changes in section due to the deep teeth formed on the side opposite to the teeth actually used, and also due to notch effects that are introduced, disproportionately high stress concentrations that lead to premature cracking are set up in the narrow tooth connection regions, so that gearing systems according to this proposal are also not satisfactory.

Eccentric planetary gears according to German patents 28 34 492 and 32 44 399 have therefore not been adopted in practice.

The invention set forth in claim 1 is concerned with the problem of providing hinge mountings of the above-mentioned kind, having an eccentric planetary gear system of which the toothed members are produced by cold extrusion moulding, in which the load-bearing capacity, particularly in the crash situation, is considerably increased compared with the known embodiments by a design that both provides good tooth attachment and, particularly in the endangered parts, avoids great differences in section and sharp transitions, and thus avoids stress concentrations, without changing the weight, dimensions or manufacturing outlay of the known embodiments. For this purpose it is necessary, in relation to the width, always to ensure a good lateral meshing relationship of the teeth even when they are overloaded, as well as comfortable operation and good functional reliability.

The particular advantages achieved by the invention are that, in addition to being fully connected at their roots, the teeth both of the pinion and of the internal gear are each securely attached or supported laterally by annular closed regions of strong material and adjoining conical annular material regions, without there being, on the opposite side to the tooth system, any abrupt changes in section, and/or only slight changes, which in addition are provided with gradual transitions, so that these parts have high load-carrying capacity. A further contribution to this is that the bearing and guiding relationships of the rolling bodies on their pivot axis and relative to one another are improved so as to prevent lateral tipping. As a result, compared with known embodiments of this kind, the various stresses occurring are substantially reduced and caused to follow a uniform course, so as to avoid high stress concentrations, which are particularly dangerous because they induce premature fracture. Furthermore, because of the relatively lower and more uniform bending stresses, the tooth systems are prevented from slipping away sideways from one another, with the result that there are advantageous stress, meshing and surface pressure relationships overall, such that in the particular case of a crash situation only plastic deformations occur and fractures in the load-bearing parts are substantially prevented, while in normal operation uniform, low-friction running is achieved, which offers easy, comfortable operation and high operational reliability. The toothed members formed as circular plates in the extrusion moulding process have, as a result of their symmetrical shape, highly accurate concentricity and planarity even after hardening or quenching. Because of their connection to the substantially larger but correspondingly thinner-walled connection hinge members the toothed members themselves can be made thicker without increasing the total amount of material used. They are therefore highly economical. Furthermore they can readily be combined with different connection hinge members, so that the same circular plates can be manufactured for several applications in correspondingly large quantities, thus saving tooling costs, which results in still further economic advantages.

Advantageous embodiments of the features according to the invention are characterised in the claims.

Exemplary embodiments of the invention are shown in the drawings and are described in more detail below. In the drawings

Figure 1:
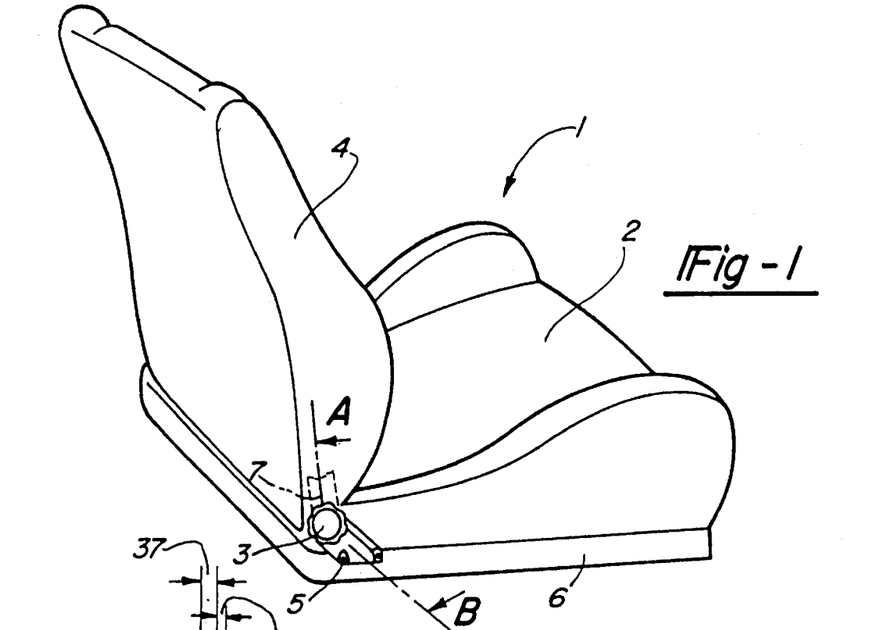
FIG. 1 shows, in a perspective view, a complete seat for a motor vehicle with a reclining backrest which is adjustable by means of the hinge mounting according to the invention.

A motor vehicle seat, as shown in FIG. 1, comprises a seat part proper 2 with a backrest 4 attached thereto by hinge mountings 3, usually provided on both sides, so that it can be pivoted and secured. A fixed hinge member 5 mounted to the seat part 2 is attached, usually by a screw connection, to a frame 6 of the seat part 4, while a pivotable hinge member 7 is attached to the frame of the backrest 4, usually by means of screws, riveting or welding.

Figure 2:
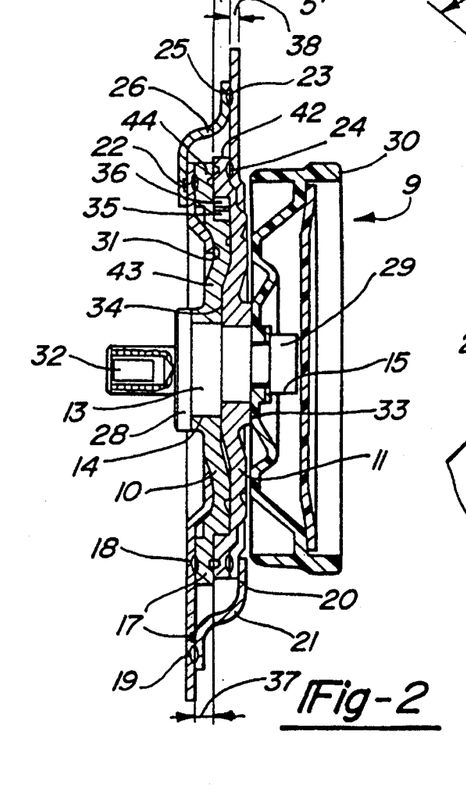
FIG. 2 shows, on a larger scale, a longitudinal section along the line A—B in FIG. 1 through a hinge mounting according to the invention, wherein both the pinion and the internal gear are formed as circular plates.
Figure 3:
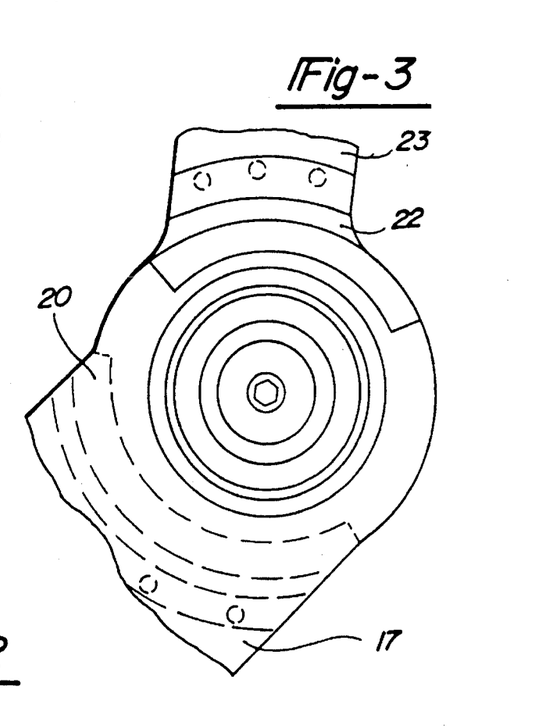
FIG. 3 is a side view of FIG. 2.

A pinion 10, produced by extrusion moulding, and an internal gear 11, fabricated in the same way, of a hinge mounting 9 having an eccentric planetary gear as shown in FIGS. 2 and 3 have the form of circular plates and are mounted on a pivot axle 13 in known manner, namely with the pinion 10 on an eccentric bearing region 14 and the internal gear 11 on a central bearing region 15. The pinion 10 has one less tooth than the internal gear 11, so that the tip circle of the pinion 10 is smaller than the root circle of the internal gear 11 by the tooth height. The degree of eccentricity of the eccentric bearing region 14 corresponds approximately to this difference, resulting in self-locking between the pinion 10 and the internal gear 11 in known manner.

As shown in FIGS. 2 and 3, a fixed hinge member 17 corresponding to the fixed hinge member 5 shown in FIG. 1 is attached to the pinion 10 through a connection region 44 by a resistance weld 18. Attached to the hinge member 17, likewise by a resistance weld 19, is a guide plate 21 with a segment region 20 which surrounds the internal gear 11 and its pivotable hinge member 23 with bearing clearance, and thus supports it axially. This pivotable hinge member 23, corresponding to the pivotable hinge member 7 shown in FIG. 1, is attached to the internal gear 11 by a resistance weld 24, likewise through a connection region 57. A guide plate 26 is likewise connected to the hinge member 23 by means of a resistance weld 25, and has a segment region 22 which surrounds the pinion 10 with bearing clearance, and thus supports it over the fixed hinge member 17. This arrangement, together with the collar 28 of the pivot axle 13 adjoining the pinion 10 and a hand wheel 30 adjoining the internal gear 11 and attached to the pivot axle 13 by a screw 29, ensures effective axial mounting of the pinion 10 to the internal gear 11 so that the conditions for laterally coincident meshing of the external tooth system 35 of the pinion 10 and the internal tooth system 36 of the internal gear 11 are well met.

The rotary movement induced by the hand wheel 30 by means of a stub shaft (not shown) is transmitted to the hinge mounting on the other side of the motor vehicle seat 1 via a coupling part 32 of the pivot axle 13.

A bearing face 33 of the pinion 10 and an adjoining bearing face 34 of the internal gear 11 lie on a centre 31 of the external tooth system 35 of the pinion 10 and of the internal tooth system 36 of the internal gear 11, so that, having regard to the bearing relationship, the respective tooth pressures on the pinion 10 and on the internal gear 11 that arise when load is applied to the eccentric planetary gear apply only the same small counterbalancing moment to the pivot axle 13, so that the angular position of the pivot axle 13 within the eccentric planetary gear only changes very slightly under load. This always has a favourable effect in assisting the full lateral meshing relationship of the tooth systems 35 and 36.

In place of the resistance welds 18, 19, 24 and 25 used, other known kinds of connection such as window arc welding, riveting and the like can be used without departing from the scope of the invention. The guide plates 21 and/or 26 can likewise be replaced by collar screws (as will be described below) arranged on the fixed hinge member 17 or the pivotable hinge member 23 respectively and bearing axially on the pivotable hinge member 23 or the fixed hinge member 17.

The manufacture of the toothed members 10 and 11 as circular plates has the advantage that because of their symmetrical form they can be fabricated as particularly accurately circular and planar parts without cutting, which in contrast is not possible to the same extent with the mountings made integrally with the connection plates, particularly when, as is often the case, hardening or tempering is required. As a result the functioning and manner of operation of the hinge mountings 3 fitted with such eccentric planetary gears is very smooth and uniform. Furthermore a greater thickness 37, for example 3.5 mm, of the starting material for the pinion 10 and the internal gear 11, compared with the substantially smaller thickness 38, e.g. 1.8 mm, of the material that can be used for the hinge members 17 and 23, which require to be much larger in size, has no, or no significant, effect in increasing the overall amount of material used. Depending on the dimensions and thickness of the material selected, it can even be less, so that for a given weight the hinge members can even be made larger, as is often desirable, so that when stress is applied to the hinge mounting the forces acting in its connections to the frames of the seat and backrest, which are made of relatively thin sheet metal, become relatively smaller and these connections are strengthened by a more harmonious transition, whereby the resistance of the seat to fracture, particularly in the case of a crash, is increased without the use of more material.

In the design of the pinion 10 the tooth width 41 corresponds to the thickness 37 of the starting material and the inner edge of the external tooth system 35 coincides with an outer face 42 of the material of the pinion 10. An upper region of the bridge 43 thus occupies a position offset from the connection region 44 of the pinion 10 by an amount corresponding to the thickness 37 of the starting material, as is shown clearly in FIG. 4.

Figures 4, 5, 6:
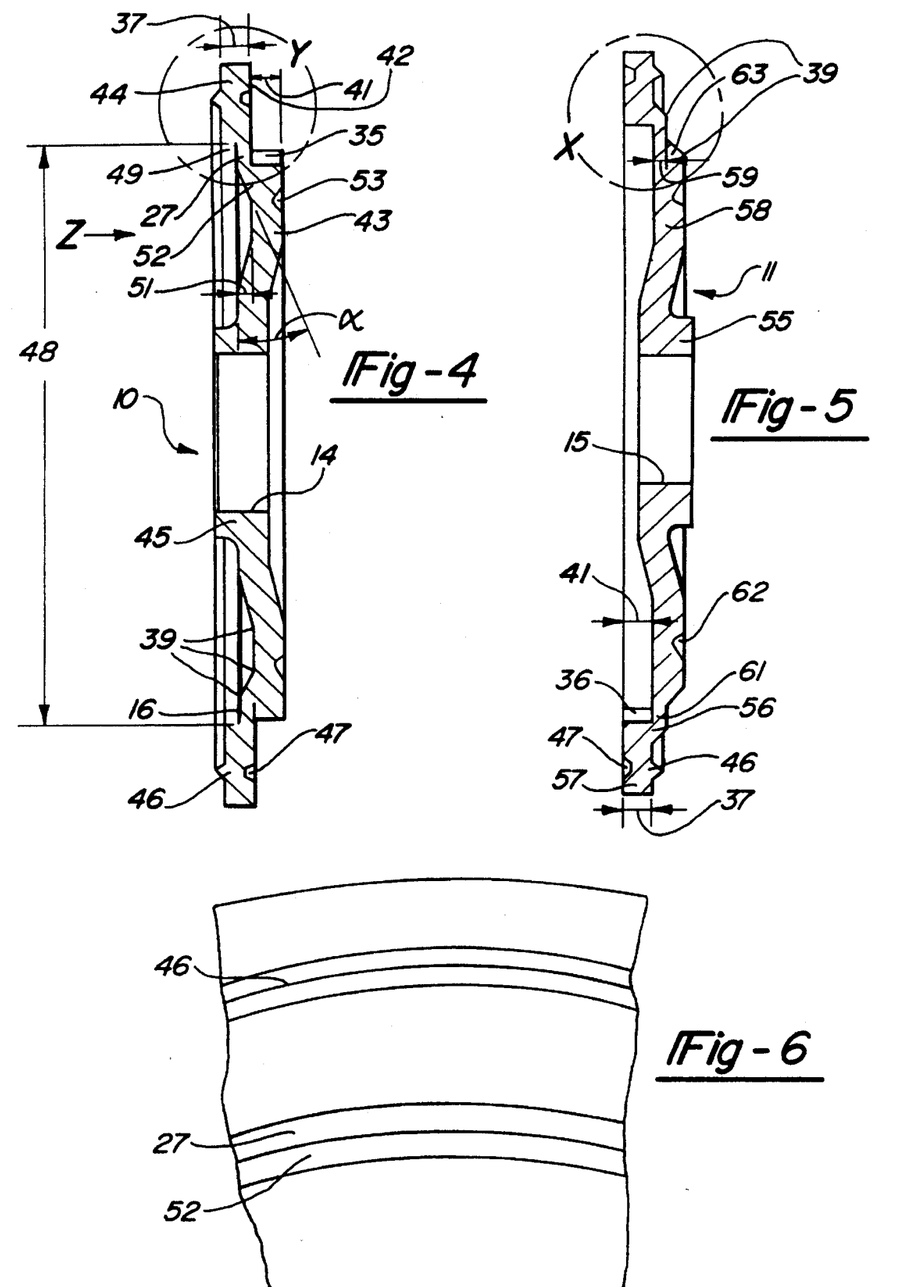
FIG. 4 shows, on an enlarged scale, a single pinion formed as a circular plate, as used in FIG. 2.
FIG. 5 shows, on an enlarged scale, a single internal gear formed as a circular plate, as used in FIG. 2.
FIG. 6 is a partial view in the direction of the arrow Z shown in FIG. 4.

The eccentric bearing region 14 is made about 60% wider than the thickness 37 of the starting material by means of a raised hub 45, so that in this way the bearing relationship is further improved in respect both of the surface pressure and of preventing tilting on the pivot axle 13.

A strong resistance weld 18 is achieved by the use of a pressed-out welding ring 46 having a triangular cross-section, as shown, or a toroidal cross-section. The volume of material for the welding ring is made available by indenting an annular groove 47 on the other side.

In this example, on the side opposite to the external tooth system 35, the extrusion moulding process used produces a continuous annular region 27 of material having a thickness 51 of from about 40% of the thickness 37 of the starting material, beginning at a diameter 48 that is correspondingly larger than the tip circle of the external tooth system 35, which is adjoined from about the diameter of the root circle of the external tooth system 35, at an angle α of about 30°, by a conical annular region 52 that forms a gradual transition to the wall of the bridge 43, thus creating an advantageous stress distribution. This applies both to the connection of the teeth and to the connection of the external tooth system 35 to the bridge 43 and to the connection region 44, wherein transitions are made less abrupt by roundings-off 39 or low-angled chamfering 16 of the edges and corners. Within the scope of the invention the thickness 51 of about 40% of the thickness 37 of the starting material can be selected, depending on the manufacturing and operating conditions and the quality and treatment of the material, to be from 28% to 50% or more. The material required for the complete formation of the teeth in this embodiment is obtained both from the portions between the teeth of the external tooth system 35 that have been pressed through to the opposite side, i.e. from the gaps between the teeth, and from the material of an indented free annular region 49 having a diameter 48 which is greater than that of the tip circle of the external tooth system 35. Furthermore, the material which is displaced by indenting a corresponding annular groove 53, such as is provided on the side of and beneath the tooth system 36, can be used for this purpose, depending on the values selected for the thickness 51 and the dimensions of the annular region 49.

In the case of the internal gear 11 shown in FIG. 5 a corresponding relationship of the thickness 37 of the starting material relative to the widened central bearing region 15 can be seen; here its mounting on the pivot axis 13 is improved by also forming in the extrusion moulding process a hub 55 having its bearing length increased by about 60%.

In addition a welding ring 46 for the resistance weld 24 is formed in the same way. A connection region 57 with the adjoining internal tooth system 36 is here offset (by the tooth width 41) relative to a bridge 58 of the internal gear 11 by the width 37 of the starting material, so that in this case the tooth width 41 likewise corresponds to the width 37 of the starting material. Laterally adjoining the internal tooth system 36, starting at about the diameter of the tip circle of the internal tooth system 36, a completely closed annular region 61 of material having a thickness 59 of from 35% of the thickness 37 of the starting material is formed, so that the internal tooth system 36 is adequately attached laterally to transmit the large forces in the crash situation. Outwardly adjoining the annular region 61 of material is a conical annular region 56 that forms a gradual transition to the connection region 57, and inwardly the region 61 is gradually connected to the bridge 58 in the same way by means of a conical annular region 63 with an angle of 30° to 40°. All the edges 39 of the transitions may be rounded. Altogether, in the case of the internal gear 11 this ensures both a sound lateral attachment for the internal tooth system 36, with a full connection for the tooth roots, and also advantageous transitions to the bridge 58 and connection region 57, avoiding stress concentrations. The material required for this comes from the portions between the teeth pressed through on the other side of the internal tooth system 36 and the material of the bridge 58 outside the conical annular region 63. Additional material is contributed by an annular groove indented in the other side of the smaller diameter region of the internal tooth system 36.

Figure 7:
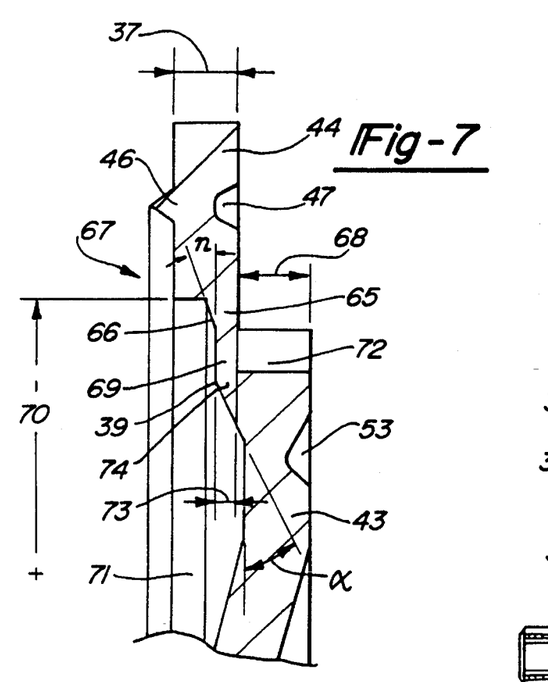
FIG. 7 is an enlarged illustration of a further variant of the detail Y shown in FIG. 4.
Figure 8:
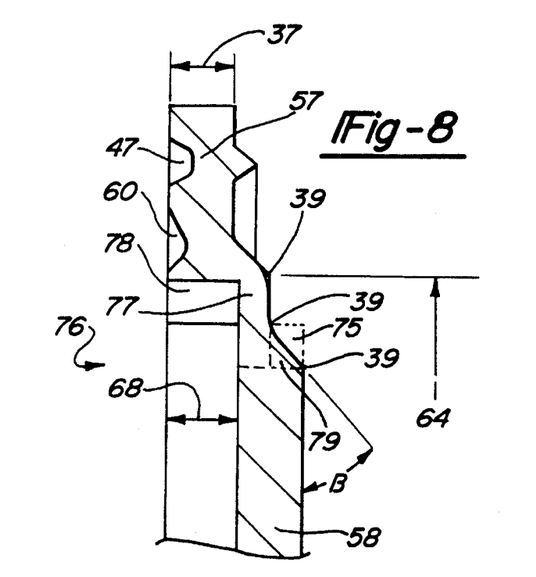
FIG. 8 is an enlarged illustration of a further variant of the detail X shown in FIG. 5.

The pinion 10 and the internal gear 11 can also be formed with the offsetting or pressing out of their external and internal tooth systems to the connection regions 44 or 57 or to the bridge 43 somewhat greater than corresponds to the thickness 37 of the starting material, in order to obtain a greater tooth width, as will be clear form FIGS. 7 and 8.

In the case of a pinion 67 shown in FIG. 7 the tooth width 68 of an external tooth system 72 is made about 10% larger than the thickness 37 of the starting material. Formed laterally of the external tooth system 72 is a closed annular region 69 of material having a thickness 73 of from 36% of the thickness 37 of the starting material, to which the external tooth system 72 is thus also soundly attached in this exemplary embodiment. This region 69 is extended inwardly by a conical annular region 74 which continues at a corresponding low angle α of about 30° to the bridge 43 as a transition. The transition of the annular material region 69 to the connection region 44 also extends gradually outwardly as in the case of the pinion 11, as is shown by the flat, obliquely outwardly extending contour 66 of a transition region 65.. This contour forms a chamfer 16 with the angle γ. Furthermore the corners and edges 39 between neighbouring regions are likewise rounded. As a result of this design, in the case of the pinion 67 there is again a stress-equalising connection of the external tooth system 72 both to the outer connecting region 44 and to the bridge 43, with the roots of the teeth connected across their whole width. In this way the somewhat higher bending stress is transmitted without difficulty and with little stress concentration by the enlarged tooth width 68. The material required for the regions 65, 69 and 74 is taken from the free annular region 71 of which the diameter 70 is larger than that of the external tooth system 72, as well as from that of the tooth gaps of the external tooth system 72 that is not pressed through, or, depending on the dimensions selected for the annular region 71 and the conical annular region 74, the material is made available by indenting an annular groove 53 underneath the external tooth system 71, as in all the other exemplary embodiments of the invention.

Analogous relationships exist in the case of an associated internal gear 76 shown in FIG. 8, wherein the tooth width 68 of an internal tooth system 78 is likewise 10% greater than the thickness 37 of the starting material and a corresponding closed annular region 77 of material having a thickness 54 of from 35% of the thickness 37 of the starting material is provided.

This annular material region 77 is gradually joined to the bridge 58, at a low angle β of about 30°, by a conical annular region 79, the shape being smoothed by rounded corners 39. It has an external diameter 64 greater than the diameter of the root circle of the internal tooth system 78. The material required for this form is likewise obtained, in addition to the tooth gap portions, by displacing a free conical annular section 75 shown by a dash-dot line and correspondingly shaded, and also, if necessary, from an annular groove 60 on the side of the internal tooth system 78.

Figure 9:
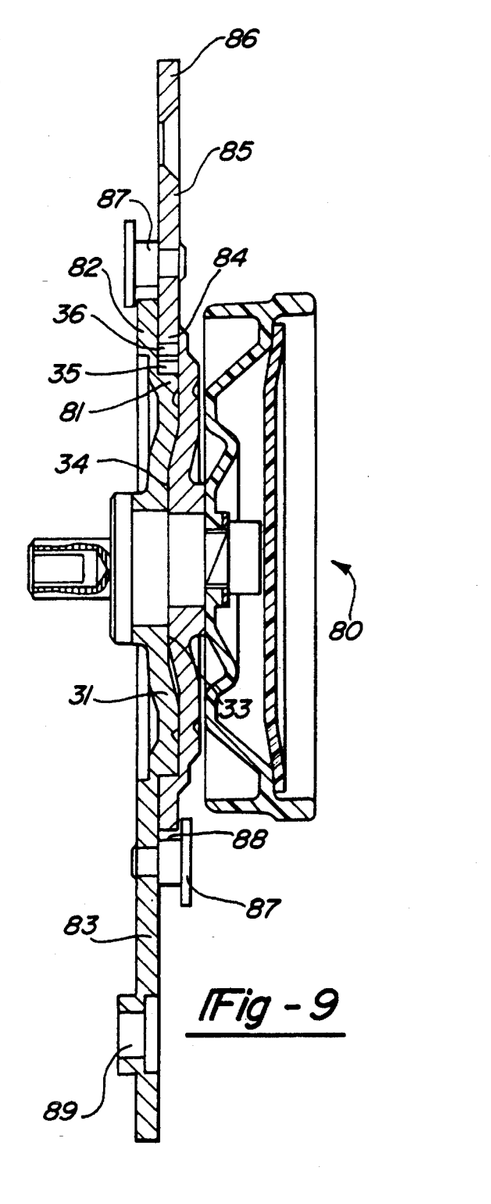
FIG. 9 is a longitudinal section through a hinge mounting in which both the pinion and the internal gear are integral with their hinge members.
Figure 10:
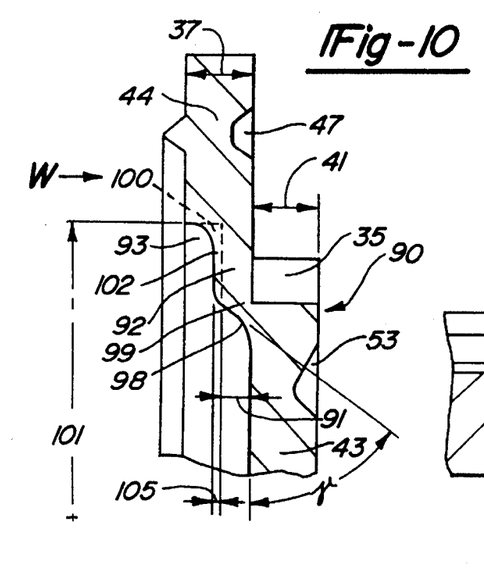
FIG. 10 is a detail Y shown in FIG. 4, but a further modified embodiment thereof.
Figure 11:
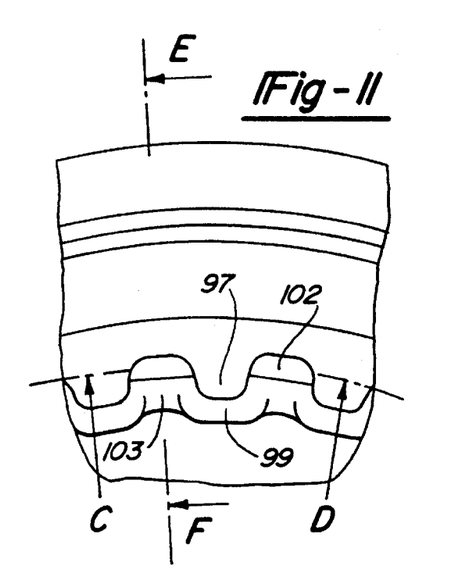
FIG. 11 is a partial view in the direction of the arrow W shown in FIG. 10.
Figure 12:
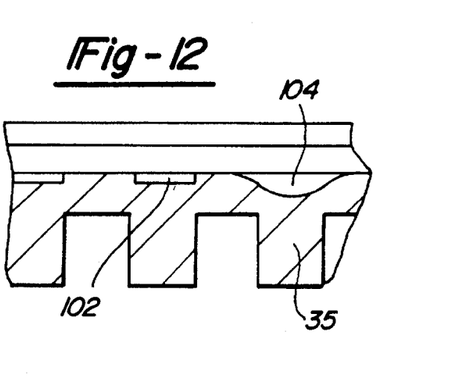
FIG. 12 is a sectional representation along the line C—D in FIG. 11, shown as a developed view.
Figure 13:
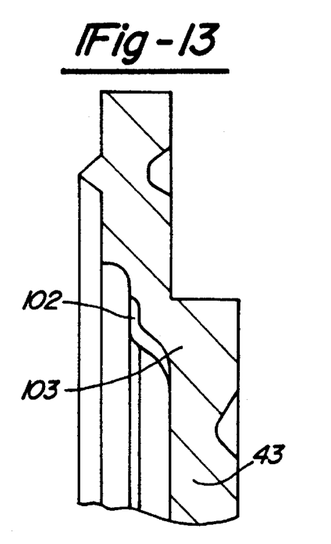
FIG. 13 is a sectional view along the line E—F in FIG. 11.

In a simplified embodiment of the hinge mounting 80 shown in FIG. 9 both a pinion region 81 with a connection plate 82 to a fixed hinge member 83 and an internal gear region 84 with a connection plate 85 to a pivotable hinge member are made by cold extrusion moulding, in each case integrally. As in the embodiment shown in FIG. 2, in the hinge members 83 and 86 the centre 31 of the external tooth system 35 and the internal tooth system 36 lies axially level with the mutually abutting bearing faces 33, 34 of the two hinge members. The fixed and pivotable hinge members 83 and 86 respectively are, as in the case of the corresponding hinge members 5 and 7 shown in FIG. 1, each connected to seat parts using the holes 89. The other embodiments according to the invention and the geometrical features of the gear mechanism of this hinge mounting 80 also correspond analogously to those of the other hinge mountings proposed according to the invention. As an alternative to the guide plates 21 and 26, axial guidance of the parts relative to one another is assisted by means of two or more guide bolts 87 in each hinge member with the undersides of their heads abutting with a small amount of clearance against a central region 88 on the connection plates 82 and 85 of the fixed and pivotable hinge members 83 and 86 respectively, which are in face-to-face contact.

In an exemplary embodiment of the pinion 90 shown in FIGS. 10 to 13, wherein the tooth width 41 is equal to the thickness 37 of the starting material, the external tooth system 35 is connected to a continuous annular region 92 of material having a thickness 91 of about 40% of the thickness 37 of the starting material and, increasing its thickness, a flat annular region 100 of material having a thickness 105 of about one quarter of the thickness 91 is also provided, in which indentations 102 of uniform depth are provided in the form of, and arranged to coincide with, the tooth tips of the external tooth system 35. The parts 97 remaining between the indentations 102 are connected to the bridge 43 by sloping connecting portions 99 that run round them as far as the indentations 102. In the region between the lateral parts of the sloping portions 99 corresponding sloping portions 103 are likewise provided, with these two portions 99 and 103 gradually running into the bridge at an angle γ of about 40° with pronounced roundings 98, so that transitions are everywhere provided that avoid stress concentrations.

Here, too, the material needed for the full pressing out of the teeth of the outer tooth system 35 and of the annular region 100 of the sloping portions 99 and 103 is provided, apart from the portions available between the teeth of the pressed-through external tooth system 35, from a free annular region 93 having a diameter 101 greater than that of the tip circle of the external tooth system 35, and through the indentations 102 and the free spaces also present and the material of the annular groove 53 on the side of the tooth system. To obtain a particularly advantageous. Stress-concentration-reducing form, the indentations 102 can also be made in a corrugated form 104 and rounded in the bottom and at the upper transitions.

Figures 14, 15, 16:
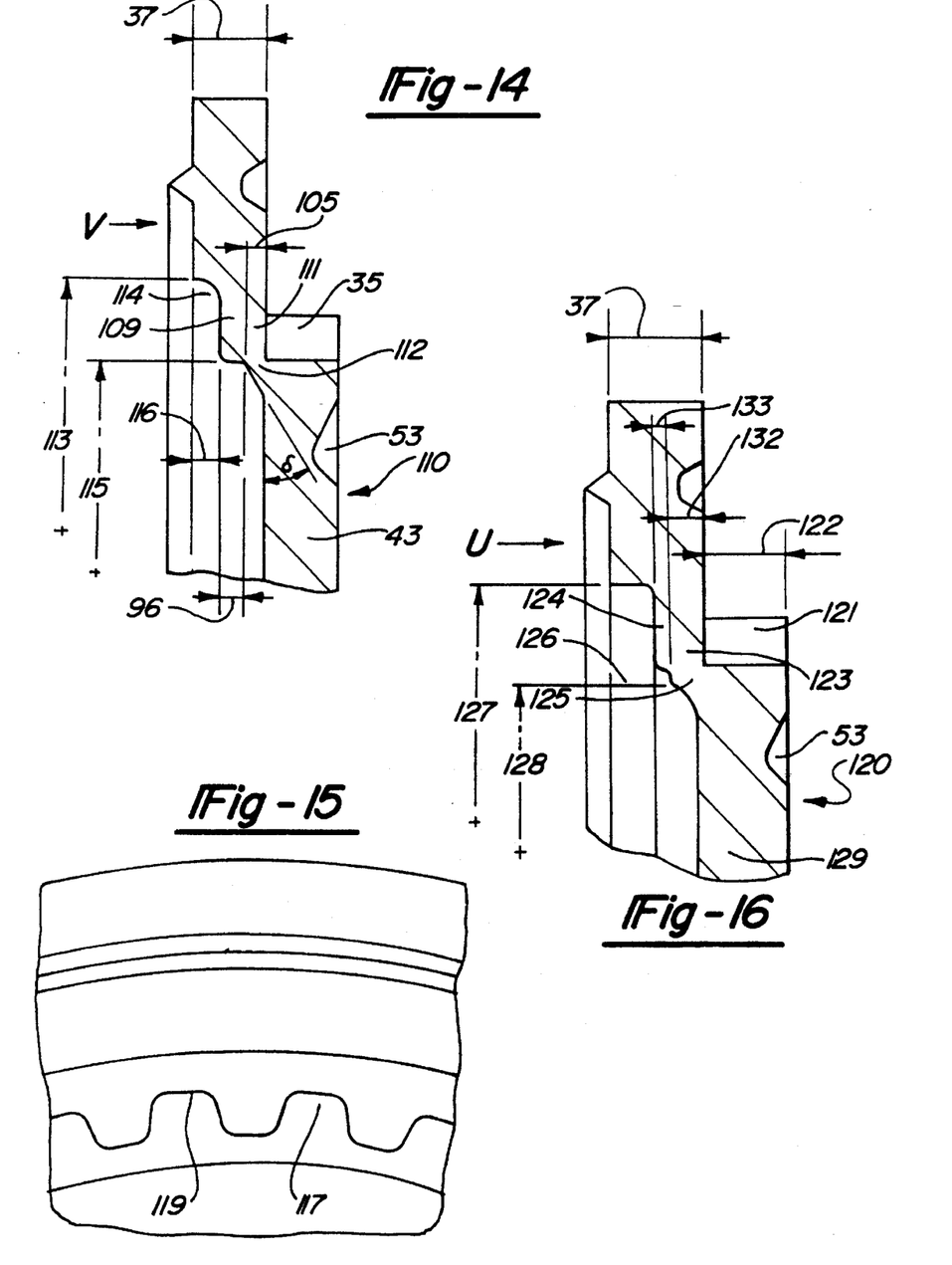
FIG. 14 is the same view as FIG. 7 but shows a further modified embodiment.
FIG. 15 is a view in the direction of the arrow V in FIG. 14.
FIG. 16 is the same view as FIG. 7, but shows a further modified embodiment.

In a further variant according to the invention, shown in FIGS. 14 and 15, the material needed to connect the external tooth system 35 of the same width 37 as the starting material thickness to a closed annular region ! ! 1 having a thickness 105 of at least 28% of the thickness 37 of the starting material, and to provide an adjoining conical annular region 112 that runs at a low angle δ of about 35° from the annular region 111 to the bridge 43, and also for an annular region 109 that augments the annular region 111, is provided by indenting a free circular annular region 114 and sloping indentations 117, which are indented in the annular region 109 in a form 119 corresponding to the teeth of the external tooth system, likewise at an angle δ, and which adjoin the conical annular region 112. The free annular region 114 with a diameter 113 extends beyond the tip circle of the external tooth system to the required extent, with the diameter 115 of the conical annular region 112 starting somewhat smaller than that of the root circle. The annular region 109 has a thickness of about 28% of the thickness 37 of the starting material.

Figure 17:
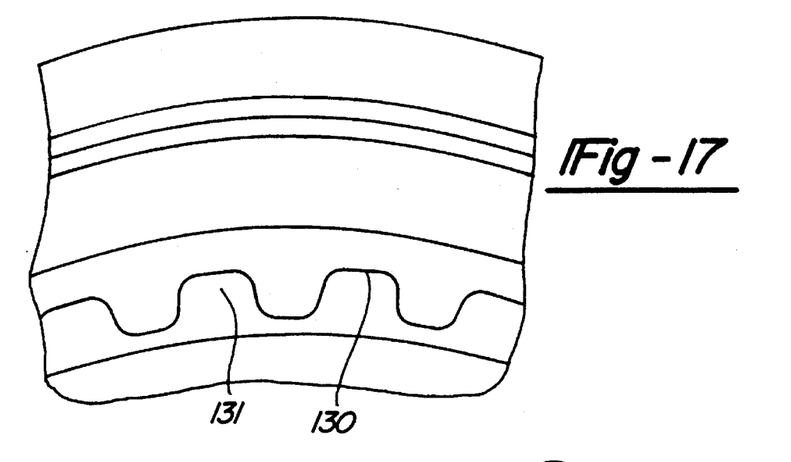
FIG. 17 is a view in the direction of the arrow U shown in FIG. 16.

The embodiment of the invention shown in FIGS. 16 and 17 includes a pinion 120 with an external tooth system 121 having a tooth width 122 smaller by about 10% than the thickness 37 of the starting material. The external tooth system is soundly attached laterally by means of a continuous annular region 123 produced laterally of the external tooth system 121 and having a thickness 132 of about 40% of that of the thickness 37 of the starting material, supplemented by a partly continuous region 124 having a thickness of about 25% of the thickness 126. Adjoining the annular region 123 on the inside there is a conical annular region 125, running out to the bridge 129. In the annular region 124 flat indentations 121 are formed to the depth and in the position of the teeth of the external tooth system 121. The material for the circular annular regions 123 and 124 and the conical annular region 125 is taken from these indentations and from a circular annular region 126 having a diameter 127 that exceeds that of the tip circle of the external tooth system 121, and by indenting an annular groove 53 on the tooth system side. The tooth width of the associated internal gear, not described here, is adapted analogously. The narrower tooth width 122 in connection with the favourable bearing arrangement and the lateral attachment of the teeth according to the invention and suitable choice of material does not detract from its performance, since the danger of fracture of the teeth under overload is more critical than the surface pressure on the tooth surface.

Figure 18:
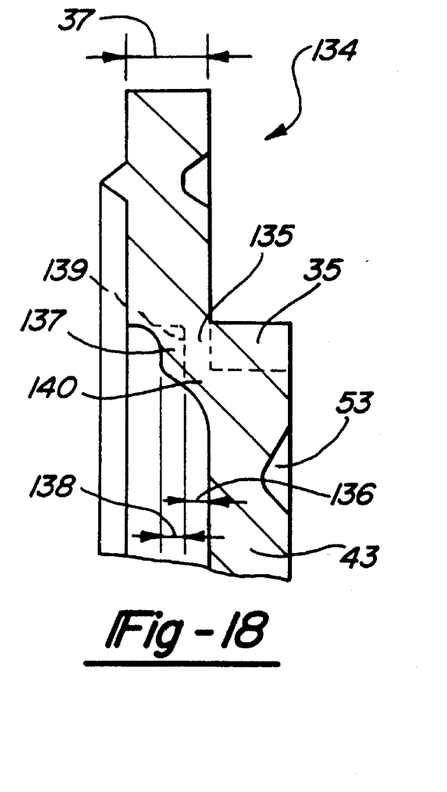
FIG. 18 is the same view as FIG. 7, but shows a further modified embodiment.

In the design shown in FIG. 18, the external tooth system of a pinion 134 is laterally attached to an annular region 135 of material with a thickness 136 of from 28% of the thickness 37 of the starting material. Further laterally adjoining it and covering the annular material region of the external tooth system 35 is an annular region 137, interrupted by indentations and having a thickness 138 of about 20% of the thickness 37 of the starting material. Regarded laterally, the indentations 139 in the region 137 are aligned with the teeth of the external tooth system. They can have the form of the external tooth system 35, or alternatively they can be pressed in a corrugated form, rounded on all sides, similar to the form 104 shown in FIG. 12. Here, too, a conical annular region 140 adjoins the region 135 on the inside, to provide a gradual transition from the latter to the bridge 43. The material required for the annular regions 135 and 137 and the conical region 141 is made available in a similar manner to that in the examples described above.

Figure 19:
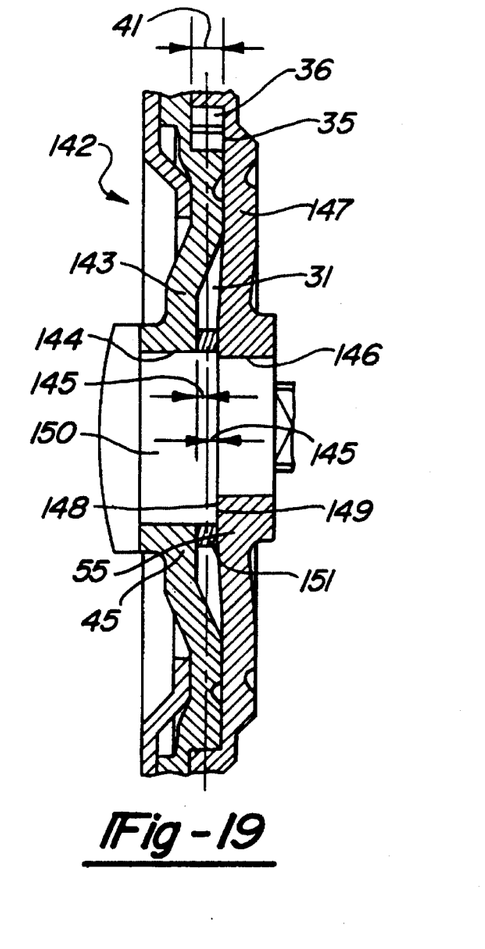
FIG. 19 is a partial sectional view corresponding to FIG. 2, but with the mounting regions of the pinion and internal gear separated.

An example of an eccentric planetary gear with a broader mounting is shown in FIG. 19 as a partial section, the parts not shown being analogous to those of FIG. 2. A pinion 143 has an eccentric bearing region 144 starts at a distance of almost half the tooth width 41 from a centre 31 of the internal and external tooth systems 35 and 36 respectively. A central bearing region 146 of an internal gear 147 begins at the same distance 145 from the centre, so that a bearing face 148 of the internal gear 147 is in contact with a bearing face 149 of the pivot axis 150. The pinion 143 and the internal gear 147 can support one another through a spacer ring 151, with bearing clearance. The eccentric bearing region 144 and the central bearing region 146 each comprise hubs 45 and 55 respectively that are wider than the thickness 37 of the starting material. Here, too, there is complete internal cancellation of the tilting moment.

We claim:

1. A hinge mounting for vehicle seats having a seat part proper and an adjustable backrest; said hinge mounting comprising; a fixed hinge means associated with the seat part proper, and a pivotable hinge means associated with the backrest, one of said hinge means including a pinion having an external tooth system including a plurality of teeth with gaps between the teeth on a first side of said pinion, and the other one of said hinge means including an internal gear having an internal tooth system including a plurality of teeth with gaps between the teeth on a first side of said internal gear, said internal tooth system meshing with said external tooth system and forming an eccentric planetary gear system for providing an inclination adjustment and securing mechanism for the vehicle seat, said pinion and said internal gear being formed from a starting material of a first thickness by a cold extrusion molding process, and said pinion and said internal gear having teeth of a width that is about the same as the thickness of the starting material, said pinion and said internal gear having second sides that are opposite to said first sides and which are formed through the extrusion molding process to have continuous first annular regions of material each having a thickness of at least 28% of the thickness of said starting material and adjoining annular conical regions of material, the material of said annular regions being at least in part made available both from the gaps between the teeth of said tooth systems and from further annular circular regions pressed in on said second sides, said pinion having a bearing face and said internal gear having a bearing face engaging said bearing face of said pinion, and wherein the center line of said external tooth system of said pinion and of said internal tooth system of said internal gear lie in the same plane as said bearing faces.

2. A hinge mounting for seats according to claim 1, wherein the width of the teeth is 10% greater than the thickness (37) of the starting material.

3. A hinge mounting for seats according to claim 1, wherein said pinion and said internal gear include eccentric bearing regions having hubs the length of which is at least 1.6 times the thickness (37) of the starting material.

4. A hinge mounting for seats according to claim 3, wherein said pinion and said internal gear each includes a bridge portion interposed between said hub and said annular regions of material, and wherein the thicknesses of the annular regions of material of said pinion and said internal gear are at least 35% of the thickness of the starting material, and wherein said adjoining annular conical region adjoins the bridge portion at an acute angle ($\alpha$).

5. A hinge mounting for seats according to claim 4, wherein said acute angle ($\alpha$) is about 30°.

6. A hinge mounting for seats according to claim 3, wherein said pinion and said internal gear each includes a bridge portion interposed between said hub and said annular regions of material, and wherein the annular material region of said pinion has a thickness of at least 28% of the thickness of the starting material and is adjoined laterally by an annular material region having a thickness of about 28% of the thickness of the starting material and inwardly by a conical annular region which leads to the bridge portion at an angle ($\delta$) of about 35°, with sloping indentations being pressed into said bridge portion opposite to and in the shape of the external tooth system at an angle ($\delta$) and with a free circular annular region having a diameter greater than that of the tip circle of the external tooth system.

7. A hinge mounting for seats according to claim 1, wherein said pinion has a connection region connected to said continuous annular region of material, and wherein the annular region of material of said pinion has a thickness of about 40% of the thickness of the starting material and passes into the connection region at an external diameter greater than the tip circle diameter of the external gear system.

8. A hinge mounting for seats according to claim 1, wherein the annular region of material of said pinion has a thickness of 40% or more of the thickness of the starting material and an internal diameter smaller than that of the root circle of the external tooth system and is adjoined laterally by an annular material region having a thickness of about 25% of the thickness of the starting material and a diameter greater than that of the tip circle.

9. A hinge mounting for seats according to claim 1, wherein the annular material region of said pinion has a thickness of at least 28% of the thickness of the starting material and is adjoined by an annular material region that has a thickness of at least 20% of the thickness of the starting material and is interrupted by indentations, said indentations corresponding in shape and position to the teeth of the external tooth system.

10. A hinge mounting for seats according to claim 1, wherein said pinion and said internal gear are in the form of circular plates of starting material of a thickness of about 3.5 mm, and wherein said fixed hinge means and said pivotable hinge means each includes a hinge member of a thickness of about 1.8 mm.

11. A hinge mounting for seats according to claim 1, wherein said fixed hinge means includes a fixed hinge member and said pivotable hinge means includes a pivotable hinge member, and wherein said pinion and said internal gear are respectively formed integrally with said fixed hinge member and said pivotable hinge member.

12. A hinge mounting for seats according to claim 1, characterized in that the width of said teeth is about 10% smaller than the thickness of the starting material.

13. A hinge mounting for seats according to claim 1, wherein a portion of the material for said annular regions of said pinion and said internal gear is obtained from annular grooves and indentations pressed in on said first sides of said pinion and of said internal gear.

* * * * *

UNITED STATES PATENT AND TRADEMARK OFFICE
CERTIFICATE OF CORRECTION

PATENT NO. : 5,531,504
DATED : July 2, 1996
INVENTOR(S) : Gerhard Schmale, Ralf Hoge and Martin Zynda It is certified that error appears in the above-indentified patent and that said Letters Patent is hereby corrected as shown below:

On title page,

Item [76], under Inventors, delete "Zynch" and insert --Zynda--.

Signed and Sealed this

Twelfth Day of November, 1996

Attest:

BRUCE LEHMAN

Attesting Officer     Commissioner of Patents and Trademarks